United States Patent [19]

Walton et al.

[11] Patent Number: 5,097,379
[45] Date of Patent: Mar. 17, 1992

[54] AUTOMATIC OR MANUAL CIRCUIT RESTORATION APPARATUS AFTER A PRESCRIBED TIME DELAY

[76] Inventors: John F. Walton, 6853 Strata St., McLean, Va. 22101; Al R. Roshdieh, 688 College Pkwy., Rockville, Md. 20850

[21] Appl. No.: 439,001

[22] Filed: Nov. 22, 1989

Related U.S. Application Data

[63] Continuation of Ser. No. 194,919, May 17, 1988, abandoned.

[51] Int. Cl.⁵ .............................. H02H 3/24
[52] U.S. Cl. ............................ 361/92; 361/59; 361/75; 361/86
[58] Field of Search ............... 361/59, 71, 72, 73, 361/74, 75, 77, 85, 86, 90, 92

[56] References Cited

U.S. PATENT DOCUMENTS

| | | | |
|---|---|---|---|
| 3,541,392 | 11/1970 | Vargo et al. | 361/59 |
| 3,809,963 | 5/1974 | Hutchinson | 361/75 |
| 3,940,664 | 2/1976 | Matsko | 361/592 |
| 4,011,484 | 3/1977 | Paice et al. | 361/33/59 |
| 4,333,119 | 6/1982 | Schoenmeyr | 361/77 X |
| 4,538,197 | 8/1985 | Breen | 361/74 X |
| 4,644,438 | 2/1987 | Puccinelli et al. | 361/75 |
| 4,680,706 | 7/1987 | Bray | 361/75 |
| 4,698,718 | 10/1987 | Chow et al. | 361/77 X |

*Primary Examiner*—Todd E. DeBoer
*Attorney, Agent, or Firm*—Howard L. Rose

[57] ABSTRACT

A circuit is provided which responds to single or multiphase low or lost voltage situations and in the case of multiphase systems to phase reversals or shifts to disconnect a single or multiphase load from its source. A timing circuit is provided which prevents reactivation of the load until a prescribed time interval has elapsed. The reactivation may be either automatic or manual.

10 Claims, 2 Drawing Sheets

AUTOMATIC OR MANUAL CIRCUIT RESTORATION APPARATUS AFTER A PRESCRIBED TIME DELAY

This is a continuation of co-pending application Ser. No. 194,919, filed on May 17, 1988, now abandoned.

BACKGROUND OF THE INVENTION

The present invention relates to a circuit for determining a phase or voltage fault in a power supply line and more particularly to such a circuit for disconnecting a load from a power line upon a voltage or phase fault and for automatically reconnecting the load at a predeterminable time interval after the fault has been cleared.

In the prior art, upon failure of voltage or phase in a power line supply the lines are manually reset or instantly reset automatically upon a fault apparently being cleared. This function leads to human error in resetting or automatic reset too quickly or before the fault has been completely cleared or too many times in a short interval. Such errors can have disastrous results and are avoided in accordance with the present invention.

BRIEF DESCRIPTION OF THE INVENTION

In accordance with the present invention there is provided circuitry for sensing a loss of or reversed phase in a multiphase (3 or 2 phase) supply and for sensing a loss of voltage on a single or multiphase supply. In a first embodiment of the present invention once normal conditions have been restored the system may automatically restore to operation after a predeterminable and variable time delay or may be restored manually immediately. In a preferred embodiment of the invention the system may be restored, only after a predetermined time delay, either automatically or manually.

DETAILED DESCRIPTION OF THE DRAWINGS

Figure 1:
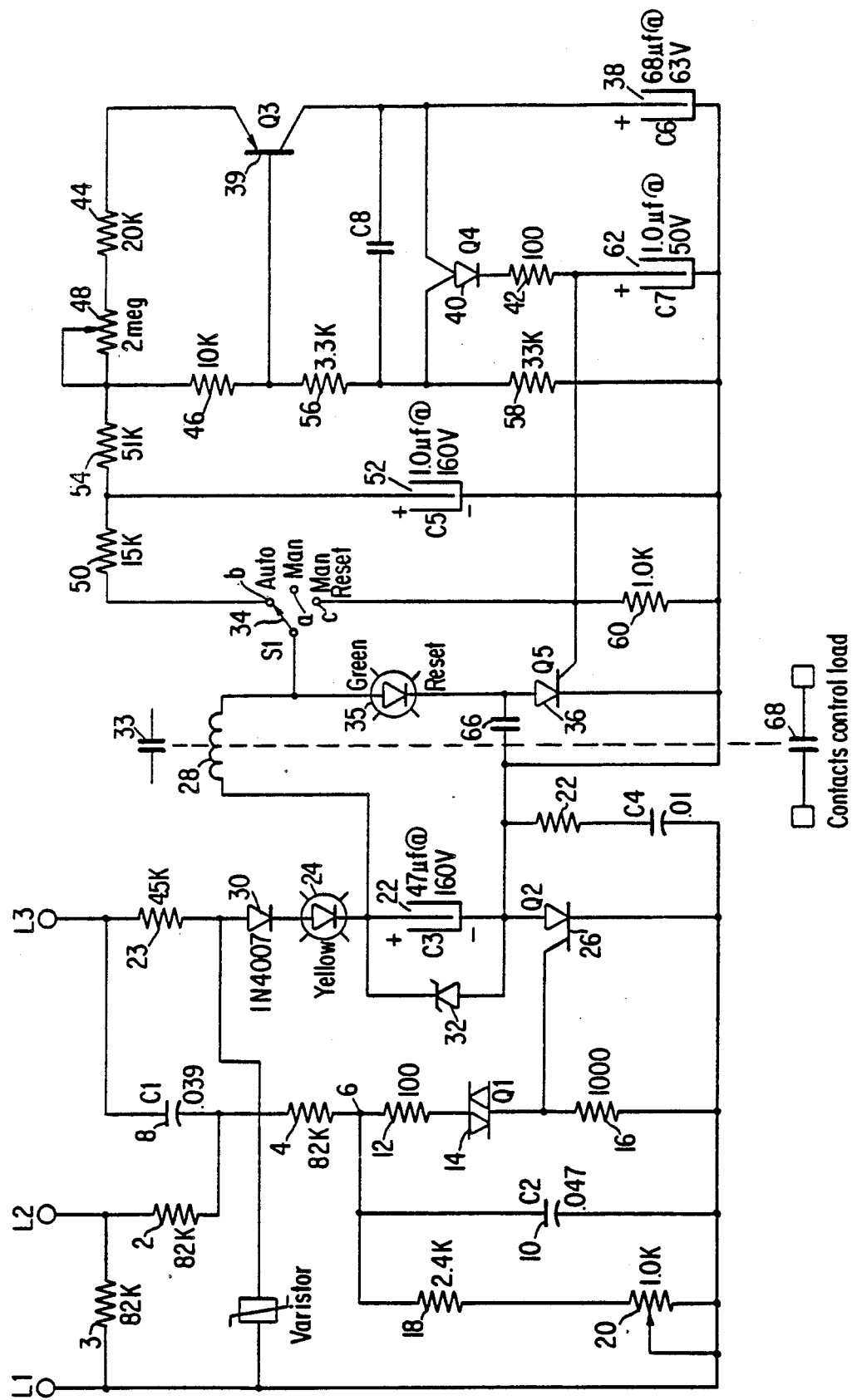
FIG. 1 is a circuit diagram of a first embodiment of the present invention.

Referring now specifically to FIG. 1 of the accompanying drawings, the terminals of the three phases of the supply are labeled L1, L2 and L3 for the three input lines. Line L2 is connected via resistors 2 and 4 to junction 6 while line L3 is connected via a differentiating capacitor 8 to the junction 7 of resistors 2 and 4. A varistor 9 is connected between phases 1 and 3 to suppress transients.

The junction 6 is connected via capacitor 10 to line L1 and is paralleled by a series circuit comprising resistor 12, bilateral trigger diode (diac) 14 and resistor 16. A trimming circuit of resistor 18 and potentiometer 20 also parallels capacitor 10. In the event that there were no normal external connection to terminal L2, the resistor 3 assures a lower than normal voltage (with respect to L1) at junction 7. In turn this assures a fault condition will be read by the circuit. A resistor 3 is connected between terminals L1 and L2.

Also connected between line L3 and line L1 is a series circuit for charging a capacitor 22 and firing a light emitting diode 24. The circuit includes a resistor 23, an SCR 26 which is fired every half cycle of the L2-L3 phase when their phases are correct. The diac 14 is also normally rendered conductive every negative half cycle to discharge capacitor 10.

Figure 2:
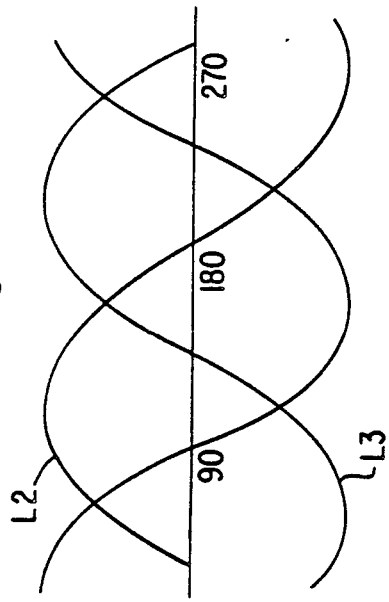
FIG. 2 is a graph of the voltages of a three phase system.

In operation, if all phases and voltages are correct the voltages across L2 and L3 add across resistor 4. Referring for a moment to FIG. 2 it is readily seen that when line L2 is at a peak voltage the voltage on line L3 is rising rapidly. The diac 14 conducts, SCR 26 fires, and the capacitor 22 is partially charged each half cycle. With capacitor 22 maintained charged, relay coil 28, a dc relay, can be energized and as will be explained below and maintains the system operative. It should also be noted that the light emitting diode 24 blinks every half cycle. The diode 30 prevents conduction through the circuit on reverse cycle thus preventing discharge of capacitor 22. The blinking of the diode 24 each half cycle provides a visual indication that the system is operating properly.

If any of the cycles reverse or a low voltage is developed on any of the lines L1, L2 or L3 the system will deenergize relay 28. Specifically if either of phases L2 or L3 is reversed, they do not add, but subtract across the resistor 4 and the diode 14 will not fire. If the line L1 voltage reverses the voltage across the circuits between lines L3 and L1 is very little and the diode will not fire. Also if a low voltage is developed on any of the lines, again the voltage necessary to fire the diode 14 will not be developed.

As indicated above the relay coil 28 maintains the system connected to its load via a contact or set of contacts 68. The one contact shown is actually the control circuit contact for a two or three pole contactor. Although only one contact is illustrated, if a three phase load is involved, three contacts would normally be employed.

A Zener diode 32 is placed across the capacitor 22 to regulate its voltage, especially when the relay coil is not drawing off charge from the capacitor and the capacitor 22 is being charged from its charging source. The Zener diode also prevents too high a voltage on the coil of relay 28. This situation routinely occurs during the delay before reset period. Without the Zener diode 32 the voltage on capacitor 22 would rise to a voltage much higher than normal. Such situation deprives LE diode 30 of enough current to make it glow with normal brightness during the timing period or even glow at all after capacitor 22 is fully charged, a state which is reached in about one second, without the Zener diode.

If the circuit has detected a malfunction, the coil 28 is deenergized and is maintained deenergized for a specified period after the system voltages have been restored. Such operation is primarily under control of that part of the circuit of FIG. 1 to the right of the coil 28 as illustrated in that figure. The relay coil 28 cannot be reenergized with switch 34 in the "auto" i.e. automatic restart position until SCR 36 is again fired.

The circuit which controls SCR 36 is a constant current charging circuit for a capacitor 38; such circuit including transistor 39. When the voltage on the capacitor 38, as seen at the anode of programmable unijunction transistor 40, (hereinafter "PUT") exceeds the voltage at its gate, the blocking state of the PUT 40 reverts to a high conductivity state. Capacitor 38 is then discharged through resistor 42 and the gate of SCR 36, thus triggering the SCR 36 to an on or conducting state. Thereupon the coil 28 of the relay is supplied with power to operate. Thereafter, the timing circuit is no longer supplied with any useful operating voltage until a fault occurs and both SCRs 26 and 36 return to a blocking state. Upon restoration of normal conditions a voltage again builds up across capacitor 22. This action starts the timing cycle all over again.

The constant current charging circuit previously referred to consists of resistors 44 and 46, potentiometer 48 and the transistor 39. This simple timing circuit is employed in order to achieve a longer delay (about double) without using a larger capacitor 38. A larger capacitor would approximately double the leakage current and since leakage current is a definitely time and temperature limiting constraint and thus both a stability and a reliability problem, the above approach is preferred. Charging to a higher triggering voltage would take longer and this would be desirable, but PUT devices currently are limited to about 40 V dc. These considerations are important since the delays desired are of the order of 15 to 30 minutes and the timer must be both very small and inexpensive. It is also desirable to have a very low power consumption and that is achieved with a level of about 125 mW on long delay.

Continuing with the description of FIG. 1, resistor 50 in series with the coil 28 combined with capacitor 52 comprise a low pass filter that provides adequately filtered dc for operation of the balance of the charging and triggering network of the timer. Resistors 54, 46, and 56 and 58 comprise a voltage divider establishing certain reference potentials necessary to the charging and triggering functions. Resistor 42 is a discharge and charge current limiting resistor and resistor 60 is a gate charge bleed-off resistor. The capacitor 62 is a noise suppresser for the gate of the SCR 36. The potentiometer 48 and resistor 44 are used to establish the value of the charging current into capacitor 38.

In the embodiment of FIG. 1, switch 34 is a three position switch and has a center off position "a", a maintained on position, "b", and one momentary on position, "c". The maintained on position is the automatic reset mode position. In the center off position the device does not reset after a fault condition occurs. The momentary on position is used for a manual reset attempt. The switch will then return to the center off position when released.

In the circuit of FIG. 1, there is the danger that an operator may throw the switch 34 to the manual restart position before a fault has cleared or simply too soon after a fault has cleared. Such operation could be quite dangerous to both the operator, the load or anyone near the load when restarted or reenergized. Frequent manual resetting over a short period of time could cause a motor failure.

Figure 3:
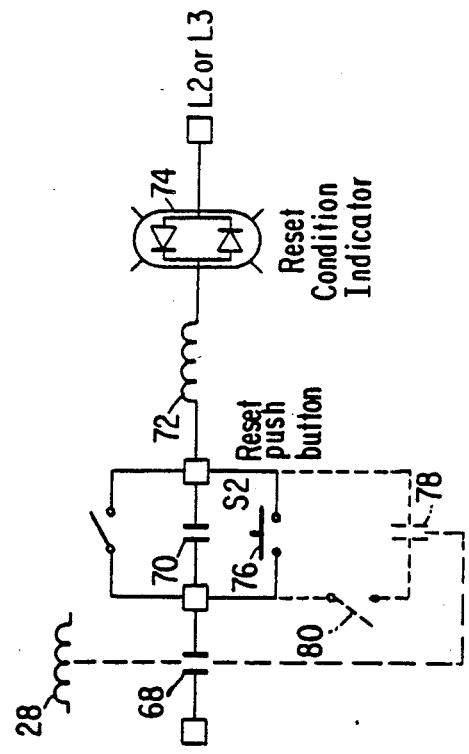
FIG. 3 is a circuit diagram of the preferred embodiment of the present invention.

This problem is overcome by the circuit of FIG. 3 which is identical with the circuit of FIG. 1 except where specific changes are indicated. The elements that are the same in both figures bear the same reference numerals.

The switch 34 has been eliminated in FIG. 3 as has the lead from the switch contact "c" to the gate of the SCR 36. A contact 66 of a relay including coil 28 has been placed in parallel with the SCR 36. The contact 66 shunts the SCR 36 whenever the coil 28 is energized thus it is a normally open contact. This assures that SCR 36 unlatches after relay K1 contacts go to the drop out state. The same contact for the same purpose is found in the embodiment of FIG. 1.

When the SCR 36 is rend after a fault, the contact 66 is closed and the SCR 36 is effectively removed from the circuit. Note however that the coil 28 cannot be energized until the fault has been cleared and the time delay restart circuit has timed out.

Referring to FIG. 3 of the accompanying drawings, the firing of SCR 36 still does not restart the system. The second contact 68 of coil 28 is connected in series with a contact 70 of a second coil 72, the second coil 72 and reset condition indicator 74. This string is connected across line L1 and one of lines L2 and L3. A push button switch 76 is connected across contact 70. Contacts 68 and 70 are normally open contacts. When coil 28 is energized contact 68 is closed and indicator 35 glows. The push button 76 can now be safely closed, energizing coil 72 which closes holding contact 70. The light 74 becomes energized and indicates the system is connected to its load via contacts of K2 shown in this figure.

If automatic operation is desired a maintained switch contact 78 may be placed in parallel with push button switch 76. If it is closed, energization of coil 28 renders the system operative automatically.

Figure 4:
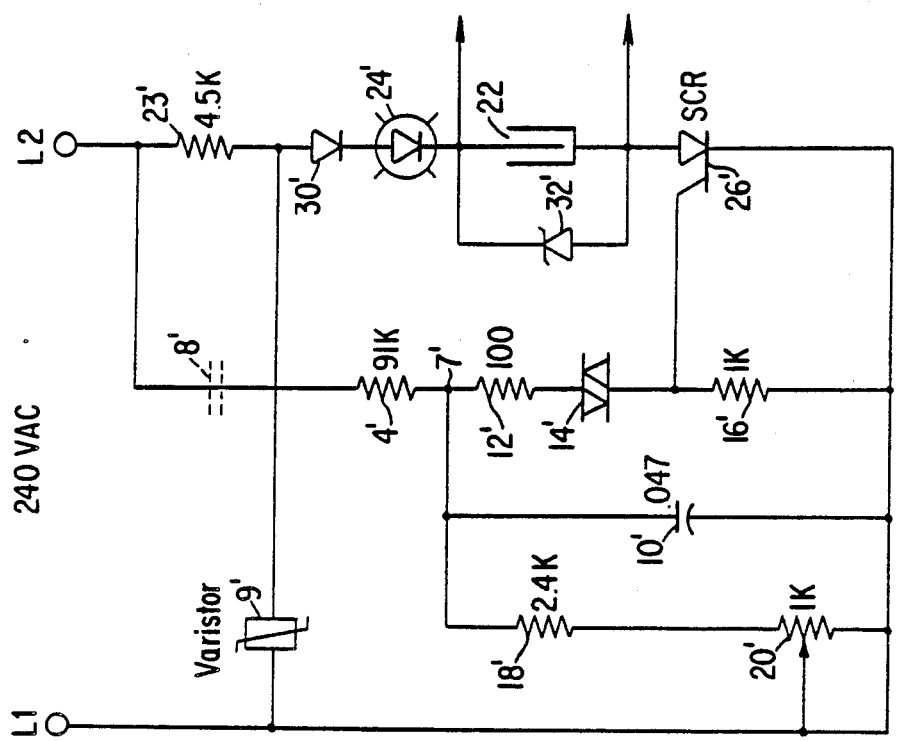
FIG. 4 is an adaptation of the system to a single phase system.

Referring specifically to FIG. 4 of the accompanying drawings, there is illustrated a circuit for use with a single phase system. Essentially the operation is the same as disclosed in FIGS. 1 and 2 and common elements in FIG. 4 have the reference numerals of FIG. 1 with primes. The only difference between the two circuits is the interconnection of phase L2 of FIG. 1 and the resistors 2 and 3 interconnecting phase L2 of FIG. 1 with phases L1 and L3.

The differentiating capacitor 8' may be added. The addition of this capacitor advances the time during the half cycle when the SCR 26' conducts so that a longer conduction interval results during the half cycle.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. A line fault detection and restoration control circuit comprising:
    means for sensing a fault involving low and loss of voltage on a supply line,
    means for sensing a fault due to a phase abnormality on a supply line,
    means for disconnecting a load from said supply lines in response to detection of any such fault,
    means for establishing a predeterminable and variable time delay after such fault has been cleared,
    means for automatically reconnecting load to supply after such time delay,
    means for manually reconnecting load to supply after such time delay, and
    switch means for selecting one of said automatic and manual means for reconnecting.

2. A control circuit according to claim 1 further comprising
    means for indicating when said voltages and phases are correct, and
    means for indicating when the load is connected to the supply.

3. A control circuit according to claim 2 wherein said means for disconnecting comprises
a relay,
a silicon controlled rectifier and a light emitting diode connected in series with said relay, and
means for rendering said rectifier conductive after such time delay has timed out to activate said relay,
said relay having contact means which are closed upon actuation of said relay, means responsive to closing of said contact means to connect load and supply.

4. A control circuit according to claim 3 further comprising
a contact of said relay connected in parallel with said first mentioned silicon controlled rectifier,
said contact being closed upon said relay being activated.

5. A control circuit according to claim 1 wherein said means for disconnecting comprises
a relay,
a silicon controlled rectifier and a light emitting diode connected in series with said relay, and
means for rendering said rectifier conductive after such time delay has timed out to activate said relay,
said relay having contact means which are closed upon actuation of said relay, means responsive to closing of said contact means to connect load and supply.

6. A control circuit according to claim 5 further comprising
a second relay,
said second relay connected across a supply to be sensed,
said first mentioned relay having a normally open contact in series with said second relay,
said normally open contact being closed upon said first mentioned relay being energized,
means for energizing said second relay after closing of said normally open contact,
said second relay having a contact means connecting load to supply.

7. A control circuit according to claim 5 further comprising
a contact of said relay connected in parallel with said first mentioned silicon controlled rectifier,
said contact being closed upon said relay being activated.

8. A control circuit according to claim 1 wherein said means for disconnecting comprises
a silicon controlled rectifier connected in series with a capacitor,
means including said silicon controlled rectifier for charging said capacitor every positive half cycle of at least one of the phases of a supply,
means for terminating conduction of said silicon controlled rectifier upon detection of a fault,
said relay being connected across said capacitor.

9. A control circuit according to claim 8 further comprising
a contact of said relay connected in parallel with said first mentioned silicon controlled rectifier,
said contact being closed upon said relay being activated.

10. A control circuit according to claim 1 further comprising
a contact of said relay connected in parallel with said first mentioned silicon controlled rectifier,
said contact being closed upon said relay being activated.

* * * * *